United States Patent
Greif et al.

(10) Patent No.: US 6,306,192 B1
(45) Date of Patent: Oct. 23, 2001

(54) HOUSING

(75) Inventors: Volker Greif, Sindelfingen; Stefan Kochert, Weinstadt; Klaus Moessinger, Obersulm; Bernd Spaeth, Ulm, all of (DE)

(73) Assignee: Fiterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/389,485

(22) Filed: Sep. 3, 1999

(30) Foreign Application Priority Data

Sep. 5, 1998 (DE) .............................. 198 40 569

(51) Int. Cl.[7] .................................................. B01D 46/02
(52) U.S. Cl. .............................. 55/498; 55/495; 55/497; 55/503; 55/502
(58) Field of Search .............................. 55/490, 493, 496, 55/497, 498, 499, 503, 502, 504, 505, 511, 529, DIG. 31; 95/273; 210/484, 493.5; 123/198 E; 220/200, 212, 324; 316/600; 403/374.5

(56) References Cited

U.S. PATENT DOCUMENTS

| | | | |
|---|---|---|---|
| 3,514,009 | * | 5/1970 | Emery et al. ........................ 220/324 |
| 4,261,718 | * | 4/1981 | Garner ................................... 55/498 |
| 4,767,427 | * | 8/1988 | Barabas et al. ........................ 55/493 |
| 4,965,032 | * | 10/1990 | Pall ........................................ 55/523 |
| 5,106,397 | * | 4/1992 | Jaroszczyk et al. ................... 55/498 |
| 5,167,683 | * | 12/1992 | Behrendt et al. ...................... 55/498 |
| 5,178,760 | * | 1/1993 | Solberg, Jr. ........................... 55/503 |
| 5,545,241 | * | 8/1996 | Vanderauwera et al. .............. 55/490 |
| 5,725,624 | * | 3/1998 | Ernst et al. ............................ 55/497 |
| 5,951,729 | * | 9/1999 | Ernst et al. ............................ 55/498 |
| 6,067,953 | * | 5/2000 | Bloomer ........................... 123/198 E |
| 6,096,108 | * | 8/2000 | Coulonvaux et al. ................. 55/490 |

* cited by examiner

Primary Examiner—Duane Smith
Assistant Examiner—Jason M. Greene
(74) Attorney, Agent, or Firm—Crowell & Moring LLP

(57) ABSTRACT

A housing, in particular a pot-shaped filter housing. To connect housing pot 10 and cover 11, a joint consisting of closure elements such as locking clamps or bow clamps 16 is proposed which can be attached at the periphery of the housing via receivers 18. As there are more receivers 18 provided on the housing than locking clamps 16 which are required for absorbing retention forces, it is possible to vary the exact fitting position of the locking clamps according to the respective space available for receiving and mounting the housing. This is essential, because the rotating radius 27 of the tension levers 17 of the locking clamps has to be considered when mounting the locking clamps 16. It is thus possible to provide housings for any field of use with variable receivers for the closure elements.

14 Claims, 2 Drawing Sheets

HOUSING

BACKGROUND OF THE INVENTION

This invention relates to a housing, especially a filter housing, comprising a housing vessel or pot and a cover, wherein at least one closure element is provided for connecting the housing parts.

Housings of this type are disclosed, for example, in published European patent application No. EP 673,280. The housing described therein is configured substantially in the shape of a pot and is suitable for accommodating a round filter cartridge. It is possible to open the cover of the housing in order to install the round filter cartridge. When the housing is in the closed position, the cover is held on the housing pot by means of snap locks. The snap locks can, for instance, be integrally cast parts of the cover. At the opening of the housing pot, there is a flange-like projection which serves as engagement area for the snap locks. Due to the annular shape of the engagement area, the cover can thus be mounted on the housing at every angular position. A variable angular position between housing and cover is particularly of interest if the cover is provided with a connecting piece, for example, for discharging dust from the filter housing, the position of the connecting piece at the periphery of the cover being dependent upon the respective conditions for installing the filter housing. It is then possible to position the connecting piece in various positions using one and the same cover.

Snap hooks require a certain extent of space due to their geometric properties and their respective radius of action during closing action. For that reason, it is necessary to provide enough space within the mounting chamber for the filter. Because the snap hooks are rigidly mounted on the cover and because the position of the cover depends upon the position of the connecting piece on the cover, the mounting space is restricted with reference to the accessibility of the snap joints, thus limiting the flexible use of the housing.

SUMMARY OF THE INVENTION

It is therefore the object of the present invention to provide a housing which can be adjusted to the space available for installation as flexibly as possible.

This and other objects of the invention are achieved by providing a housing comprising a housing pot, a cover and at least one closure element for connecting the housing pot and the cover. A plurality of receivers are provided on one of the housing pot and the cover, and at least one engagement surface is provided on the other of the housing pot and the cover. The number of receivers is greater than the number of closure elements and each closure element is capable of being optionally engaged with different receivers and engagement surfaces.

The housing according to the invention is provided with receivers both on the cover and on the housing pot which are suitable for mounting the closure elements. The closure elements can, for example, consist of clip locks. There are, however, more receivers placed on the housing than closure elements which are required for fixing the cover on the housing pot. When fixing the cover onto the housing pot and within the respective installation chamber, the mechanic is free to choose the respective receivers which are best accessible for mounting the closure elements. Thus, it is, of course, necessary to distribute the closure elements over the entire periphery. It is not possible to position all closure elements within an angular sector of, for example, 45 degrees, for then a tight connection between cover and housing pot would no longer be assured.

Providing a surplus of receivers is additionally of advantage because the number of closure elements used can be adapted to the respective stress imposed on the filter housing. In case of excessive vibrating stress imposed on the filter housing, it is, for instance, conceivable to provide more closure elements than in filter housings used, for example, in industrial plants.

It is expedient to separate the housing pot and the cover in such a manner that it is possible to place the cover onto the housing pot in various positions. This is particularly the case if the separation between housing pot and cover has a circular cross section. The embodiment described facilitates the installation, for then both components fit with one another in each and every angular position. After having placed the cover in the desired, most advantageous position, it is then possible to choose the appropriate receivers for the closure elements.

In accordance with one modified embodiment of the invention, the receivers provided on the housing can partly be concealed by means of a shield ring. In this case, however, it is necessary to get access to the receivers in such a way that the closure elements can be mounted thereon. Apart from an improved housing appearance, such a shield ring is also advantageous because it reduces and even excludes any risk of getting hurt during the installation by edges or projections of receivers that may possibly be arranged. This measure is particularly significant because housings of that kind as described above are often installed in very small mounting spaces with the accessibility being highly limited for the mechanic.

In accordance with one advantageous embodiment, receivers arranged on the housing can be provided with reinforcing ribs. In this case, too, the shield ring is very suitable for placing said reinforcing ribs. Compared to the massive construction of the receivers, this embodiment leads to a saving in material, thus resulting in a more economical manufacturing process for the component.

According to a further embodiment of the invention, it is possible to arrange fastening means such as, for example, connecting pieces or tension clips on both components of the housing, meaning the housing pot and the cover, the fastening means being adapted to install the housing at the respective position of installation. This embodiment leads to a more flexible use of the housing. Since the angular position between housing pot and cover can be freely selected, additional operational mobility accrues concerning the positioning of the fastening means on the housing pot in relation to those provided on the cover. Consequently, by turning the cover, the user can adjust the respective positions of the fastening means to one another according to the individual application circumstances.

A modification of the invention provides an embodiment in which the receivers include a securing element against loss of the closure elements. The securing element can be realized particularly by means of a clip joint, with the closure elements being engaged therein during the initial cover installation. It is not necessary for the clip joint to absorb any retention forces, but it is merely suitable for attaching loose closure elements. This embodiment facilitates the installation especially where the available space for installation is highly limited. Furthermore, the closure elements will not get lost in case of a cover demounting, for instance, when changing the filter. During a subsequent installation, the closure elements are still located at those receivers being most suitable for that purpose, so that the mechanic does not need to determine the elements' position again. The clip joint can be developed in such a way that it is possible for the mechanic to demount the closure elements again without any great deal of effort.

One advantageous illustrative embodiment of the inventive concept involves, for instance, developing the receivers arranged at the housing cover by a notched rim and creating merely one engagement area for the closure elements at the housing pot, for example, by means of an annular mounting flange. The engagement area is thus characterized by very simplified geometric properties. The notched rim has a finite number of receivers which can also be provided together with securing elements. The engagement area configured as a flange, however, enables the closure elements to be mounted at any angular position. This facilitates the installation of the cover on the housing pot because it is not necessary for the receivers to be in true alignment to both housing halves. It is, of course, likewise possible to arrange the notched rim on the housing pot as well as the engagement area in the cover.

In accordance with a further advantageous embodiment, the housing is manufactured by way of a molding technique. It is possible to make use of metal castings or plastic injection-molded parts. The complicated geometry of the notched rim can be manufactured economically by way of the manufacturing methods mentioned before. In providing stiffening ribs, it is thus not necessary to spend any great expenditure of material on the additional receivers. The non-recurrent additional expenditure when constructing the receivers by means of cast tools has hardly any effect on large-scale manufacture either.

The above and other features of the preferred further embodiments of the invention are set forth not only in the claims but also in the description and in the drawings, it being possible for the individual features to be realized individually or combined in the form of subassemblies in embodiments of the invention and also in other fields, and to constitute independently patentable embodiments for which protection is hereby sought.

BRIEF DESCRIPTION OF THE DRAWINGS

Further details of the invention are shown within the drawings which depict illustrative schematic embodiments. In the drawings.

DETAILED DESCRIPTION OF PREFERRED EMBODIMENTS

Figure 1:
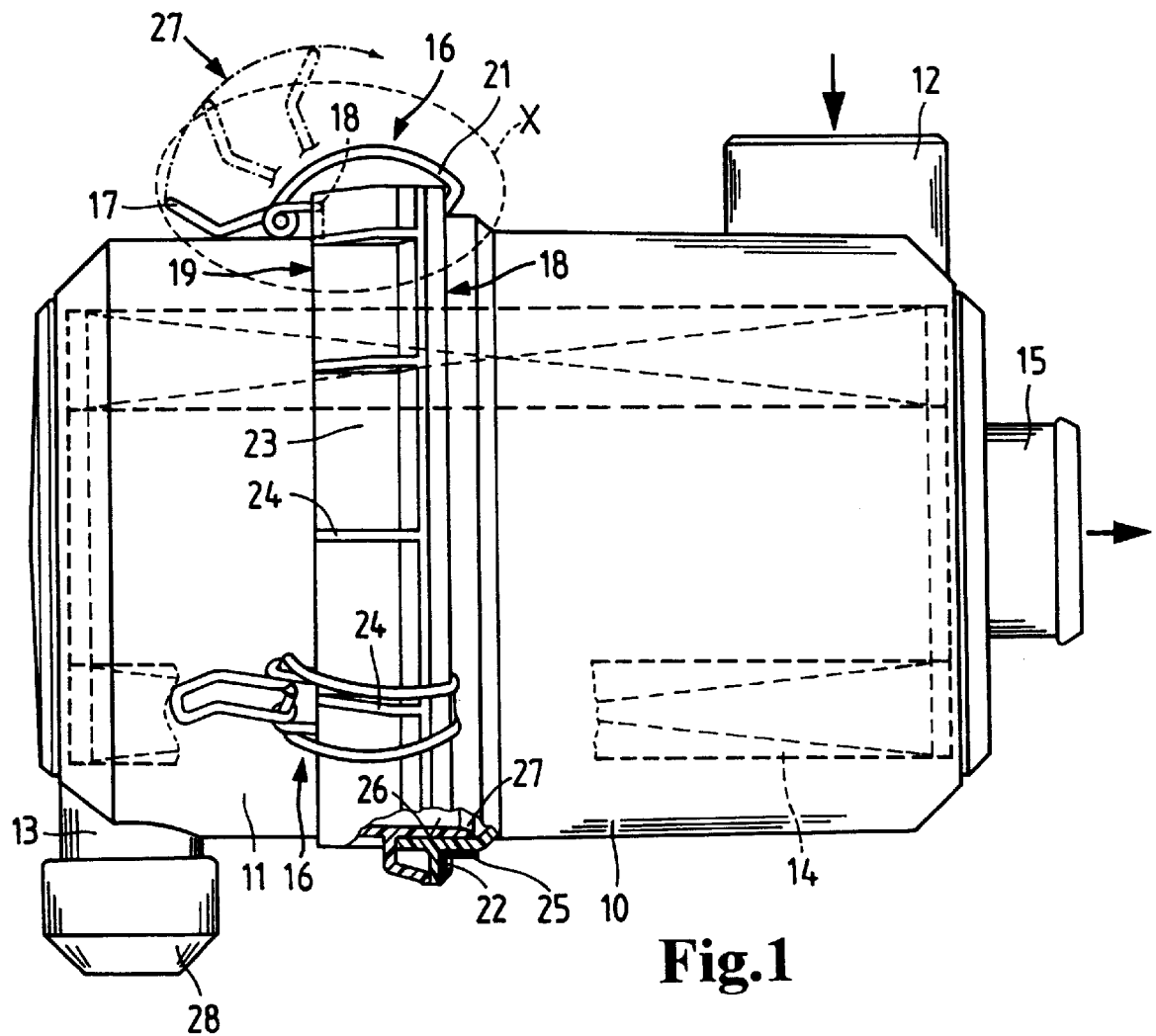
FIG. 1 shows a side illustration of a pot-shaped filter housing including clip locks.

The housing according to FIG. 1 comprises housing vessel or pot 10 and a cover 11. The housing is suitable for receiving filter insert 14. A preliminary separation of particles takes place through the eccentric introduction of the air to be filtered via inlet 12. It is possible to remove such particles by means of discharge flange 13 arranged in the cover. The air passes through filter insert 14 from outside toward inside and is then blown out of the housing through outlet 15 provided in the base of the housing pot. After filter insert 14 is mounted in position, cover 11 is placed on the housing pot 10. In order to fix the cover, closure elements 16 are provided. In the present illustrative embodiment these closure elements are developed as tension locks, which function according to the principle of an articulated lever. The rotating axis of tension lever 17 is plugged in holding fixture 18 of notched rim 19. A tension clip 21 is connected to engagement area 22, forming the holding fixture 18 on the side of the housing pot. By shifting tension lever 17, the tension clip 21 will be prestressed, thus fixing cover 11 tightly on housing pot 10. FIG. 1 shows the radius of action 27 created by operating tension lever 17, it being necessary to pay attention to the same concerning the space available for installing the filter housing.

The notched rim 19 is concealed by shield ring 23. The housing is manufactured from plastic material. For that reason, it is necessary to stabilize the shield ring by means of stiffening ribs 24 so that the shield ring will absorb retention forces introduced by the closure elements. On the side of housing pot 10, holding fixture 18 is stabilized by a supporting ring 25, which can, for example, be manufactured of steel and which forms the engagement area 22 for tension clip 21.

At the same time, the flexibility of the plastic cover is adapted to be used for sealing housing pot 10 against cover 11. A contact area 26 is formed by sealing lip 27, the same being constructed as a cylindrical extension of cover 11. A sealing effect near contact area 26 is created through an oversized outside diameter of the cover in the region of sealing lip 27, relative to the inside diameter of housing pot 10.

Figure 2:
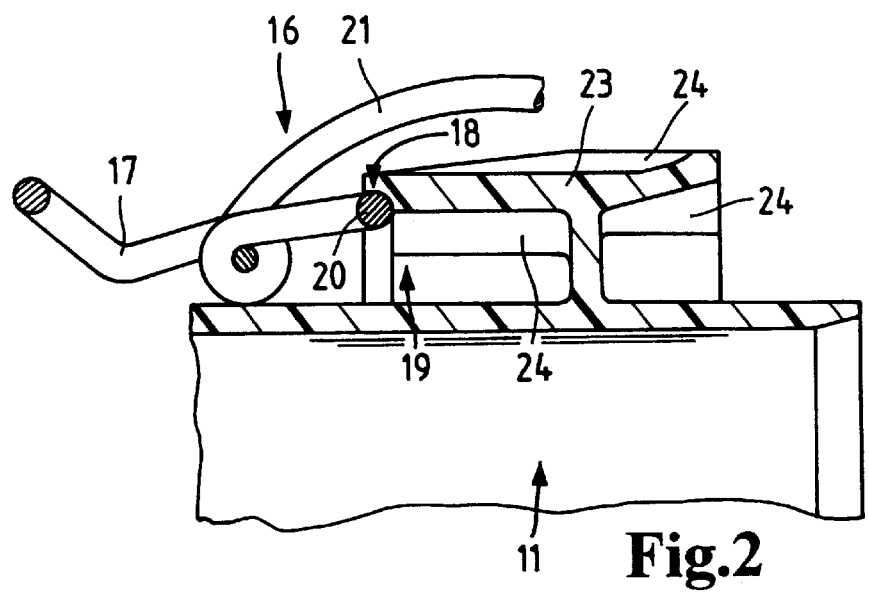
FIG. 2 is a cross-sectional illustration of detail X of FIG. 1 without the housing pot.

FIG. 2 shows the mode of operation of closure element 16 in conjunction with holding fixture 18 arranged in notched rim 19. The axis of rotation 20 of tension lever 17 engages directly in holding fixture 18, the latter working as a hinge owing to its concave inner surface. The concave surface of holding fixture 18 is directly adjacent shield ring 23 as well as one of the stiffening ribs 24. The stiffening ribs 24 are likewise placed at the inner periphery of shield ring 23.

Figure 3:
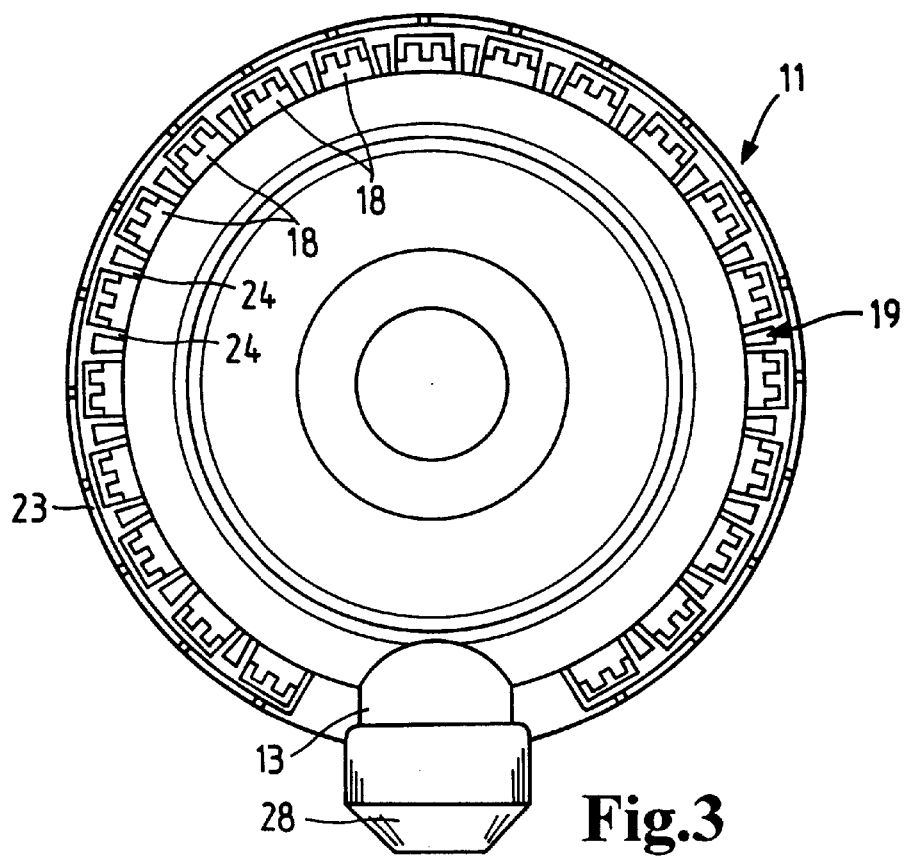
FIG. 3 is a top illustration of the housing cover according to FIG. 1, with the cover being provided with a notched rim.

FIG. 3 shows in which way the receivers 18 are distributed in the shape of notched rim 19 at the periphery of cover 11. Between each of the receivers, stiffening ribs 24 are guided from Shield ring 23 toward the outside wall of cover 11, thus leading to the required reinforcement of the receivers. There are no receivers 18 provided within the area of the dirt discharge opening 13, for the same is located within the radius of action 27 (see FIG. 1) of the closure elements to be mounted. It is possible to arrange a lock 28 at said dirt discharge opening.

Figure 4:
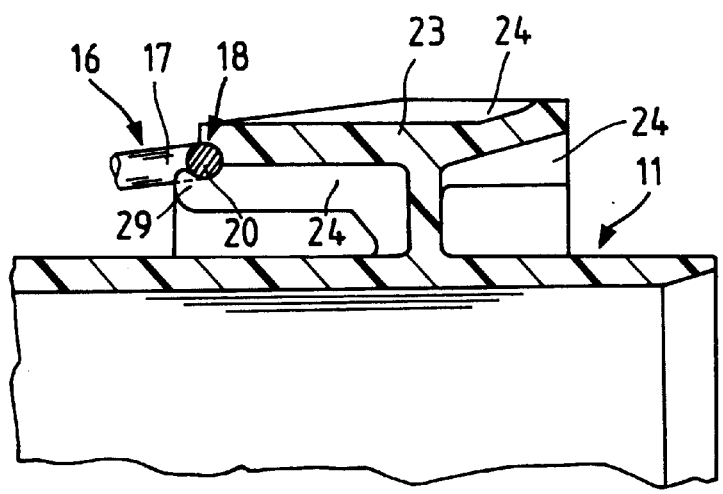
FIG. 4 is a sectional illustration according to FIG. 2 showing an alternative embodiment of notched rim.

FIG. 4 shows an embodiment of securing element 29 for the closure elements 16. The securing element is formed by a nose, the same being defined as an extension of one of stiffening ribs 24 and being disposed adjacent the axis of rotation 20 of tension lever 17. It is possible to push the rotating axis 20 in holding fixture 18 by flexibly deforming the securing element. Analogous to the variant illustrated in FIG. 2, holding fixture 18 works as a hinge for the tension lever 17. The closure element can be removed from the holding fixture 18 without any great deal of effort. Simultaneously, the securing element 29 will flexibly change its form again.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A housing comprising a housing pot, a cover and at least one closure element for connecting said housing pot and said cover, wherein a plurality of receivers are provided on one of said housing pot and said cover and at least one engagement surface is disposed on the other of said housing pot and said cover, the number of said receivers being greater than the number of said closure elements, and wherein each closure element is capable of being optionally engaged with different receivers and engagement surfaces.

2. A housing according to claim 1, wherein said cover can be installed on said housing pot at various positions.

3. A housing according to claim 2, wherein said housing pot has a pot contact surface which engages a corresponding cover contact surface on said cover when the cover is installed on the housing pot, and wherein the pot contact surface and the cover contact surface are both symmetrical about a central axis.

4. A housing according to claim 1, wherein said receivers are partially concealed by a shield ring.

5. A housing according to claim 1, wherein said receivers are provided with reinforcing ribs.

6. A housing according to claim 1, wherein receivers on at least one of said housing pot and said cover are provided with integrated securing elements for holding said closure elements.

7. A housing according to claim 6, wherein said securing elements are configured as connecting clips.

8. A housing according to claim 1, wherein said receivers are formed by a notched annular rim disposed on one of said housing pot and said cover.

9. A housing according to claim 1, wherein said housing pot and said cover further comprise connecting elements for attaching said housing to other devices.

10. A housing according to claim 1, wherein said closure elements comprise bow clamp locks.

11. A housing according to claim 10, wherein said bow clamp locks are manufactured of wire.

12. A housing according to claim 1, wherein said housing pot and said cover are molded parts.

13. A housing according to claim 12, wherein housing pot and said cover are injection-molded synthetic resin parts.

14. A housing a according to claim 1, wherein said housing is a filter housing and further comprises, in combination therewith, a filter insert enclosed therein.

* * * * *